United States Patent Office 3,357,266
Patented Dec. 12, 1967

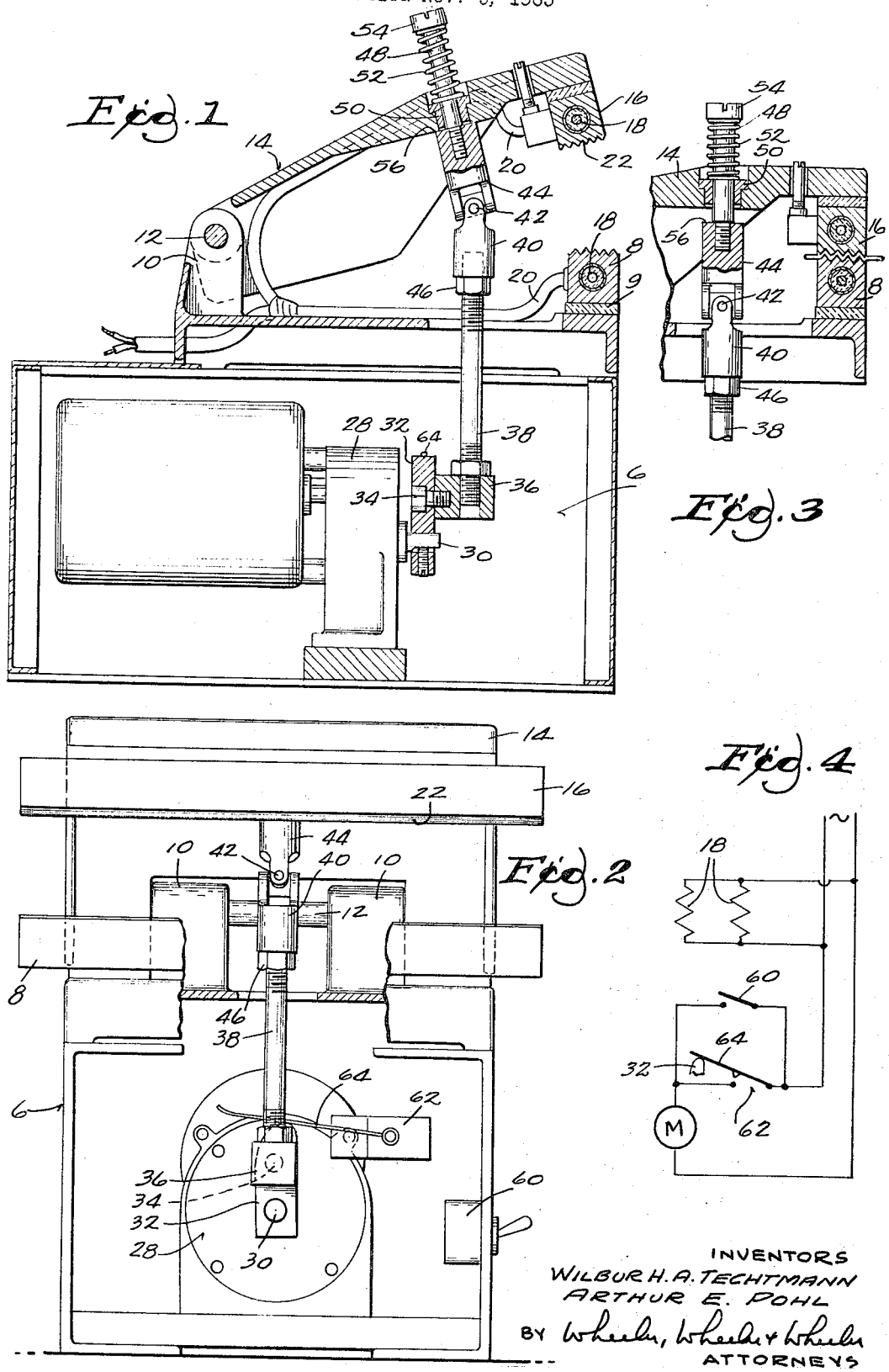

3,357,266
HEAVY DUTY BAR-TYPE SEALER HAVING MOTOR-OPERATED JAW MEANS
Wilbur H. A. Techtmann, Belgium, and Arthur E. Pohl, Milwaukee, Wis., assignors to Techtmann Industries, Inc., Milwaukee, Wis., a corporation of Wisconsin
Filed Nov. 3, 1965, Ser. No. 506,212
3 Claims. (Cl. 74—42)

This invention relates to a heavy duty bar-type sealer having motor-operated jaw means.

A motor-driven crank raises and lowers the jaw carrier arm. The actuating linkage comprises a screwthreaded connecting rod with a bearing on the crank pin, universally jointed elements one of which is adjustably threaded to the connecting rod and the other of which has thrust bearing on the underside of the carrier arm; and an extension shoulder bolt which projects through a bushing in the arm and acts as a guide and seat for a compression spring which applies the heat sealing pressure to the arm, and takes up lost motion.

The motor is preferably controlled by a circuit which includes at least two switches in parallel, one of which is controlled by the operator either manually or with his foot and another of which is a normally closed switch that is opened mechanically in each rotation of the crank as the movable arm reaches its elevated position, it being desirable that after the operator-controlled switch is opened, the motor will continue in operation until the movable carrier is elevated, and will then stop with the jaws open.

In the drawings:

FIG. 1 is a view in front to rear section through a heat sealer embodying the invention.

FIG. 2 is a view in front elevation of the heat sealer shown in FIG. 1 with portions broken away.

FIG. 3 is an enlarged fragmentary detail view similar to FIG. 1 but showing the parts with the jaws closed upon a piece of work and showing the operating connections in tension.

FIG. 4 is a motor circuit diagram.

The hollow base 6 supports a relatively fixed heat sealing bar 8 and carrier 9, and is provided with a pair of upstanding ears 10 for the pintle 12 upon which is oscillatable carrier arm 14 for the support of the movable heat sealing bar 16. Each sealing bar is preferably provided with an internal resistance coil at 18 supplied with current through appropriate conductors 20 and arranged to deliver heat to the work through the respective contact surface 22. It is sufficient to have one bar heated if the materials to be sealed are plastic films such as polyethylene, propylene, pliofilm, etc. Heating both bars is desirable if the device is used for cellophane, glassine, overcap labels, and military laminates such as kraft-backed and scrim-backed materials.

It is contemplated that there may be mounted on the sealing bars any desired accessories such as hole punches and data embossing dies such as those used for code dating.

Within the hollow base there is a motor and reduction gear assembly 28 having an output shaft 30 provided with crank 32. Mounted on the crank pin 34 is a connecting rod bearing 36 from which projects the rod 38. To this is screwthreaded (for purposes of adjustment) the universal joint member 40, which has a universal joint 42 of any desired type connecting it with universal joint member 44. The lock nut 46 maintains the adjustment of universal joint member 40 on rod 38.

At its upper end, the universal joint member 44 normally has direct thrust engagement against the lower surface of the pivoted arm 14 of the movable heat sealing bar 16. A shoulder bolt 48 threaded into the universal joint member 44 extends through a bushing 50 in this arm and serves as a guide for the compression spring 52 seated against the head 54 of the shoulder bolt 48.

The universally jointed members 40 and 44 accommodate the compound movement which results from the pivotal movement of connecting rod bearing 36 in one plane and the pivotal movement of the arm 14 in a different plane. At the same time, the difference in diameter between the universal joint member 44 and the extension shoulder bolt 48 provides a shoulder at 56 which seats securely against the under surface of arm 14 to transmit thrust for lifting the arm in an upward direction and for supporting it under thrust of spring 52 in a lowering direction. In this device, no separate means is required for adjusting the bias of the compression spring 52. The adjustment provided between the connecting rod 38 and the universal joint member 40 serves to adjust the opening of heat sealing bar or jaw 16 from the heat sealing bar or jaw 8 and to this extent the spring compression is adjusted.

The circuit of motor 28 can be energized by closing either of at least two switches. The switch 60 is actuated by the operator and may comprise either a manually operated switch or a pedal operated switch (or both). The switch 62 has an operating arm 64 which extends over the path of crank 32 so that each time the crank is in the position shown in FIGS. 1, 2 and 4 the switch 62 will be opened.

If the switch 60 is closed, the motor 28 will continue in operation. However, if the switch 60 is opened as shown in FIG. 4, the motor will nevertheless continue in operation as energized through switch 62 until the circuit through switch 62 is broken by engagement of crank 32 with the arm 64. The purpose of this arrangement is to insure that each time the operation of the sealer is interrupted, it will always stop with the jaws open. The open-jaw position corresponds to the position in which the crank projects upwardly to engage the operating lever 64 of switch 62.

Optionally, the circuit may include a timer operated switch (not illustrated) which will provide for a dwell of the jaws in the closed position to increase the sealing time when very heavy work is involved. The timer will desirably be adjustable to permit this time to be varied.

We claim:

1. A jaw type sealer having a movable jaw and a supporting arm therefor, crank means for the operation of the movable jaw, and a motion transmitting connection between the crank means and the movable jaw including universally jointed members, one of which has a connecting rod bearing on the crank means and the other of which is in thrust engagement with the under side of the supporting arm of the movable jaw, an extension guide from said last mentioned member which projects beyond said arm and is provided with a spring seat, and spring means connected with said seat for yieldably transmitting motion from said guide to said arm.

2. A jaw type sealer according to claim 1 in which the connecting rod has screw threads with which one of said universally jointed members is adjustably connected, means for fixing the adjustment of said last mentioned member, the other of said members having a shoulder bolt constituting said guide and passing through said arm, said other universally jointed member having greater cross section than the shoulder bolt and being seated against the under side of said arm for transmission of upward movement thereto.

3. A jaw type sealer according to claim 2 in which the said resilient means comprises a coil spring encircling the shoulder bolt and for which the shoulder bolt has a head providing the aforesaid seat, said arm having a bushing upon which said spring has another seat.

References Cited

UNITED STATES PATENTS

| | | | |
|---|---|---|---|
| 815,485 | 3/1906 | Stewart | 64—26 |
| 2,558,140 | 6/1951 | Kruzik | 74—42 |
| 2,567,571 | 9/1951 | Merriman | 74—503 |
| 2,585,308 | 2/1952 | Goldstein | 74—504 |

FRED C. MATTERN, Jr., *Primary Examiner.*

W. S. RATLIFF, *Assistant Examiner.*